(12) United States Patent
Ashe

(10) Patent No.: US 6,269,389 B1
(45) Date of Patent: Jul. 31, 2001

(54) METHOD AND SYSTEM FOR CONTROLLING THE COPYING AND INSERTION OF CONTENTS OF DOCUMENTS

(75) Inventor: Dylan B. Ashe, Sunnyvale, CA (US)

(73) Assignee: Apple Computer, Inc., Cupertino, CA (US)

(*) Notice: Subject to any disclaimer, the term of this patent is extended or adjusted under 35 U.S.C. 154(b) by 0 days.

(21) Appl. No.: 08/435,981

(22) Filed: May 5, 1995

(51) Int. Cl.[7] .......................................................... G06F 9/00
(52) U.S. Cl. .......................... 709/100; 709/229; 713/200; 713/201
(58) Field of Search .................................... 709/100, 213, 709/217, 218, 225, 229; 713/200, 201; 705/1, 39, 52, 54, 80, 26, 30

(56) References Cited

U.S. PATENT DOCUMENTS 5,319,780 * 6/1994 Catino et al. ........................ 395/600
5,454,108 * 9/1995 Devarakonda et al. ............. 395/650

FOREIGN PATENT DOCUMENTS

0622730 A2 11/1994 (EP) .
0622730 A3 11/1994 (EP) .
0717354 6/1996 (EP) .
0717354A1 6/1996 (EP) .

OTHER PUBLICATIONS

Stone et al, VM/ESA CMS Shared File System, IBM Systems Journal, 3/91, V30, N1 p(52)(20).*
OSF/MOTIF, Programmer's Guide, pp. 16.31–16.36 1989.*

* cited by examiner

Primary Examiner—Majid A. Banankhah
(74) Attorney, Agent, or Firm—Burns, Doane, Swecker & Mathis, L.L.P.

(57) ABSTRACT

A clipboard manager which employs preemptive scheduling for access to contents of a clipboard region of memory in a computer remains backwardly compatible with application programs designed for cooperative scheduling, through the use of a locking mechanism. When an application which is designed for use with a preemptive scheduling interface desires access to the clipboard, it requests a key from a clipboard manager. As long as the application possesses the key, no other application can gain access to the clipboard. When an application which is designed for cooperative scheduling becomes the foreground program on the computer, the clipboard manager retains the key for itself. As long as this application is active, the clipboard manager prevents any other application running in the background from gaining access to the clipboard, and thereby avoids potential conflicts. Once the cooperatively scheduled application suspends operation, the clipboard manager releases the key, so that the clipboard can be accessed by other applications.

19 Claims, 3 Drawing Sheets

METHOD AND SYSTEM FOR CONTROLLING THE COPYING AND INSERTION OF CONTENTS OF DOCUMENTS

FIELD TO THE INVENTION

The present invention is generally directed to user interfaces for computers, and more particularly to a method and system for implementing a function that enables a user to copy a selected portion of the contents of a document, and to insert the copied portion elsewhere in a document.

BACKGROUND OF THE INVENTION

The evolution of the computer industry is unparalleled in its rate of growth and complexity. Personal computers, for example, which began as little more than calculators having limited memory, tape-driven input capabilities and monochrome display monitors are now able to handle almost any data processing task with relative ease. While the ever-growing increase in computing power provides greater capabilities for programmers and users alike, the corresponding increasing complexity creates an ease of use problem. Consequently, computer system designers are faced with a new challenge, namely to harness the available computing power in a form that is usable even by those with relatively little computer training, to ease the transition of users into a computer-based information paradigm.

In pursuit of this objective, in the early to mid-1980s many new input/output philosophies, such as "user friendly", "WYSIWIG" and "menu driven" became popular. These approaches to the I/O function are particularly applicable to microcomputers, also known as personal computers, which are intended to appeal to a broad audience of computer users, including those who had no previous computer experience. An important aspect of computers which employ these input/output concepts was, and continues to be, the interface which allows the user to input commands and data and to receive results. One particularly prevalent form of interface is known as the graphical user interface (GUI).

In one popular type of graphical user interface, a visual metaphor is presented to the user which defines on a display monitor a work space known as a "desktop" in which the contents of documents are presented in relocatable regions known as "windows". In addition to windows, the graphical user interface includes a number of different types of control objects, which enable the user to select from available options presented by the computer's operating system and/or application programs, as well as provide feedback to the user.

One of the functions provided by such a user interface which has contributed to its appeal is the so-called "copy-and-paste" operation. This feature enables the user to designate, or select, any desired portion of the contents of a document appearing in a window. The user can copy the selected portion of the document to a designated portion of memory known as the "clipboard". Subsequently, the user can retrieve the copied information from the clipboard, and insert it at any desired location within the document.

One of the key features of the clipboard is the fact that it can be accessed by any application program running on the computer. As a result, the user is not limited to inserting the copied information into the same document from which it was copied. Rather, the contents of the clipboard can be placed within any document displayed on the computer's monitor. Thus, for example, the user can select a paragraph of text from a document created with a word processing program and copy it to the clipboard, switch to another text document created with a different word processing program, and copy it into that document. In the same manner, the user can copy the contents of the clipboard into a non-text document, such as a drawing document created with a graphics application program. Once data has been copied to the clipboard, it remains there until replaced by a different set of data. Thus, the data on the clipboard can be repeatedly copied into documents as many times as desired by the user.

To facilitate access to the clipboard by any application program running on the computer, the computer's operating system includes an interface that controls access to the contents of the clipboard by the application programs. In one such operating system, which is designed to run on Macintosh® brand computers manufactured by Apple Computer, Inc., this interface is known as the "Clipboard Manager".

Originally, application programs gained access to the contents of the clipboard through calls made to the clipboard interface. Basically, these calls instruct the interface to clear the contents of the clipboard, place a selected piece of data on the clipboard, or retrieve the contents of the clipboard. In response thereto, the clipboard interface controls the reading and writing of data to a designated area of memory which functions as the clipboard. The amount of data that could be copied to the clipboard through some interfaces was limited. To overcome this limitation, developers of application programs began to bypass the function of the clipboard interface, and wrote instructions which directly utilized global system variables that provide access to the clipboard area in the memory. To accommodate very large amounts of data to be copied, some programs directly accessed the clipboard file stored on a disk, rather than going through the clipboard interface or using the global system variables, and thereby avoid any size limitations imposed by the interface.

In a multitasking computing environment, two or more application programs can be running on a computer concurrently. At any given time, only one of the programs is in the foreground, in the sense that it has current access to the computer's CPU and files stored in memory. For example, both a word processing program and a drawing program can be currently running on a computer. The manner in which these two programs are provided access to the CPU can be handled in one of two ways. In one approach, known as cooperative scheduling, a program is given CPU access and retains it until it reaches a convenient point at which to relinquish such access. For example, if a program is copying data to the clipboard, once the program becomes the foreground program it remains there until the copy operation has been completed. At that point, it suspends operation so that another program can run in the foreground. As a result, only one program can perform a clipboard operation at a time.

The other approach to multitask scheduling is known as preemptive scheduling. In this approach, each program runs in the foreground in limited time slots determined by the computer's operating system. A single time slot may not be sufficient for the program to complete a given task. Referring to the above example, a program may initiate a clipboard copy operation when it is given a time slot. Before the operation is completed, however, the program may have to suspend its operation, while another program comes to the foreground. In subsequent time slots the first program can complete its copy operation.

There has been a movement towards providing a newer, more robust, clipboard function for user interfaces, which enables programs running in the background, for example a user script, to have access to the contents of the clipboard, in addition to the foreground program. To avoid conflicts between plural applications which may request access to the clipboard at the same time, this type of clipboard interface employs a locking mechanism. In this approach, any given application program running on the computer can access the clipboard at any given time, whether or not it is currently in the foreground. However, while an application has access to the clipboard, it excludes access by any other application program.

To make use of the functionality provided by the new type of clipboard interface, and thereby gain access to the clipboard while running in the background, application programs must be written with instructions that are compatible with preemptive scheduling. Consequently, only newer application programs will have access to the newly available functionality. It is unlikely that a user will immediately buy all new application programs upon obtaining an operating system which contains the new type of clipboard interface. Rather, it is much more likely that the user will continue to use older application programs, which are only designed to work with the more conventional type of cooperative interface. Thus, clipboard interfaces which employ pre-emptive scheduling should be backwardly compatible, so that the clipboard can be accessed by application programs that are designed for cooperative scheduling.

SUMMARY OF THE INVENTION

In accordance with the preset invention, a clipboard interface which employs pre-emptive scheduling for access to the contents of a clipboard region of memory uses a locking mechanism to remain backwardly compatible with application programs designed for cooperative scheduling. In operation, whenever an application which is designed for use with a pre-emptive scheduling interface desires access to the clipboard, it requests a key from a clipboard manager, which forms part of the interface. As long as the application possesses the key, no other application can gain access to the clipboard. Older applications which are designed for cooperative scheduling are not aware of the need to request the key. When such an older application becomes the active application on the computer, the clipboard manager automatically retains the key for itself. Thus, while the older application is active, the clipboard manager holds the key, thereby preventing any other application running in the background from gaining access to the clipboard, and thereby avoiding potential conflicts. Once the older application suspends operation, i.e., it is no longer active, the clipboard manager releases the key, so that the clipboard can be accessed by other applications.

Further features of the present invention, and the advantages offered thereby, are explained in detail hereinafter with reference to particular embodiments illustrated in the accompanying drawings.

DETAILED DESCRIPTION

To facilitate an understanding of the principles which underlie the present invention, they are described hereinafter in the context of a particular implementation of the invention. In particular, reference is occasionally made to functions and terminology that are associated with the operating system for Macintosh® brand computers manufactured and sold by Apple Computer, Inc. It will be appreciated, however, that the practical applications of the invention are not limited to this specific implementation. Rather, the principles of the invention are applicable to any user interface which employs a globally accessible memory location that is analogous to a clipboard, to enable a copy-and-paste operation to be carried out.

Generally speaking, the present invention is directed to the architecture and operation of a clipboard manager in a user interface that runs on a computer. While the particular hardware components of a computer system do not form part of the invention itself, they are briefly described herein to provide a thorough understanding of the manner in which the features of the invention cooperate with the components of a computer system, to produce the desired results.

Figure 1:
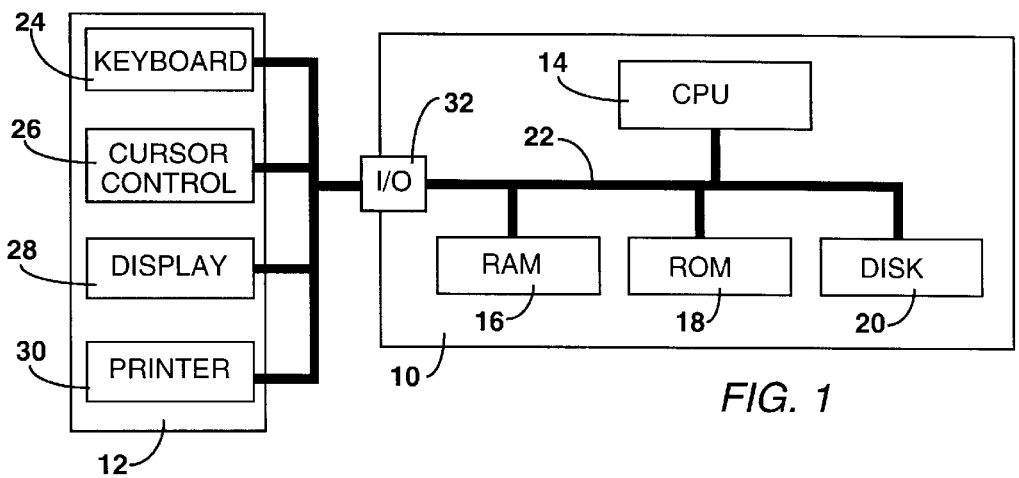
FIG. 1 is a general block diagram of a computer system of the type in which the present invention can be implemented.

Referring to FIG. 1, an exemplary computer system includes a computer 10 having a variety of external peripheral devices 12 connected thereto. The computer 10 includes a central processing unit 14 and associated memory. This memory generally includes a main memory which contains the programs currently being executed on the computer, and which is typically implemented in the form of a random access memory 16. The associated memory also includes a non-volatile memory that can comprise a read only memory 18, and a permanent storage device, such as a magnetic or optical disk 20, for storing all of the programs, as well as data files. The CPU 14 communicates with each of these forms of memory through an internal bus 22. The peripheral devices 12 include a data entry device such as a keyboard 24, and a pointing or cursor device 26 such as a mouse, trackball, pen or the like. A display device 28, such as a CRT monitor or an LCD screen, provides a visual display of the information that is being processed within the computer, for example, the contents of a document or a computer-generated image. A hard copy of this information can be provided through a printer 30, or similar such device- Each of these external peripheral devices communicates with the CPU 14 by means of one or more input/output ports 32 on the computer.

Figure 2:
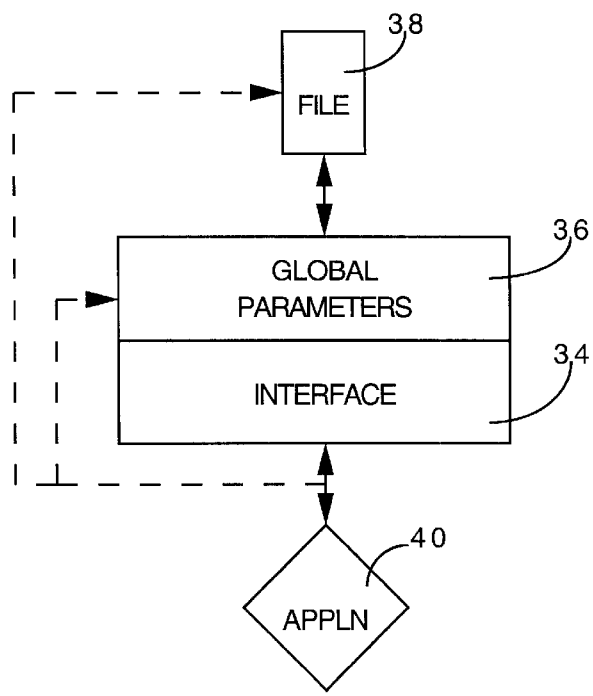
FIG. 2 is a block diagram illustrating the architecture of a conventional clipboard management interface.

The basic architecture of a conventional clipboard management interface, which forms part of the operating system that is stored in the RAM 16 and is executed by the CPU 14, is illustrated in FIG. 2. In general, the clipboard operation is controlled by a clipboard interface 34 which has various global system variables 36 associated with it. These variables designate buffers and state information pertaining to the storage area for the clipboard contents. Specifically, the contents of the clipboard can be stored at a designated address range in the main memory 16 of the computer, or in a file 38 on the hard disk 20. The particular location that is used to store the clipboard contents is determined by the interface 34. Throughout the remainder of this description, the term "clipboard file" is used in a generic sense to refer to any of the forms of media and storage locations in which the clipboard contents may be stored.

In operation, when a user instructs an application program 40 running on the computer to copy data to the clipboard, or to paste data from the clipboard into a document, the application program requests access to the clipboard through the interface 34. Specifically, when data is to be copied onto the clipboard, the application program sends a command to the interface 34 to clear the contents of the clipboard, and then to copy selected data to the clipboard. If data is to be pasted into a document, the application program sends a call to the interface to read the contents of the clipboard file. In response to these commands, the interface 34 performs the appropriate read and write actions on the file 38, using the information provided by the global parameters 36 to determine where the designated data is stored.

The clipboard interface 34 may present an inherent limitation on the amount of data that can be stored in the clipboard file. To overcome this limitation, some application programs have included their own clipboard interface, via which they directly access the global parameters 36 to write to and read from the file 38, rather than through the conventional interface 34. In other cases, application programs have been developed which gain direct access to the clipboard file 38, i.e., they do not employ either the clipboard interface 34 or the global parameters 36. The capabilities provided by this type of architecture, in which access to the clipboard file 38 can be gained through the interface 34, through the global parameters 36, or directly, is known as cooperative scheduling. To avoid conflicts which might occur if two or more application programs running on the computer attempt to gain access to the clipboard through respectively different routes, a limitation is imposed that the only application which can control the clipboard is the one which is currently running in the foreground, i.e., the active application that is currently being controlled by the user. All other application programs, i.e., those running in the background, cannot access the clipboard file, either directly or through the clipboard interface 34.

Another functionality that has become available more recently in user interfaces is known as "drag-and-drop". In this type of operation, the user designates selected data to be copied to another location, for example another document on the desktop. Once the data has been selected, the user drags it to the new location, for example by clicking a mouse button while a cursor is positioned over the selected data, and moving the cursor to the desired new location while the mouse button remains depressed. When the user releases the mouse button, a copy of the selected data is inserted at the new location of the cursor. The basic functionality associated with the drag-and-drop operation the same as that of cut-and-paste using the clipboard. Specifically, a copy of the selected data is stored in the memory, and this copy is inserted into a document at a designated location. The major difference between a cut-and-paste operation and a drag-and-drop operation is the fact that, in the drag-and-drop operation, the user does not have to manually issue menu or keyboard commands to copy the selected data to the clipboard and to subsequently paste the data from the clipboard to the designated document. Rather, these commands are implied by dragging the selected data to the new location.

Because of the similarities between the copy-and-paste operation and the drag-and-drop operation, the underlying software which implements the functionality of these two operations can be the same for each. To avoid duplication of this software, a new type of interface can be employed to handle both functions. In the context of the present invention, this new interface is known as a "scrap manager". With reference to the desktop metaphor provided by the user interface, a selected piece of data from a document, which the user desires to copy to another location, can be likened to a scrap of paper containing text or other information that is to be incorporated in a document. Thus, the data designated by the user through the computer interface is sometimes referred to as "scrap".

Figure 3:
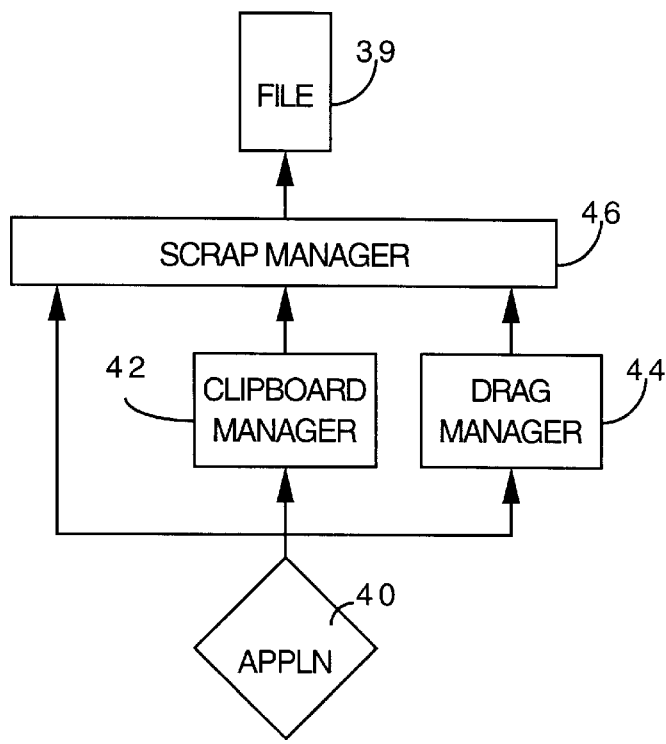
FIG. 3 is a block diagram illustrating the general architecture of the scrap manager interface.

Referring to FIG. 3, the general architecture of an interface which accommodates both cut-and-paste operations and drag-and-drop operations is illustrated in block form. Application programs 40 issue calls to a clipboard manager 42 or a drag manager 44, depending upon whether the user requests a copy-and-paste type of operation or a drag-and-drop type of operation. Each of these two managers communicates with a scrap manager 46. The scrap manager is a generic data transport model which transfers data between a source and a destination. The scrap manager performs functions analogous to those of the clipboard interface in the conventional system of FIG. 2. More particularly, in response to a call from the clipboard manager 42 or the drag manager 44, the scrap manager allocates a memory region to the requesting manager. This allocation is provided to the application program 40, which then communicates directly with the scrap manager 46 to carry out the operations of writing data into the allocated region and reading data therefrom.

The clipboard manager 42 and the drag manager 44 both make calls to the scrap manager 46, requesting allocation of a region in memory and the transfer of data to or from the allocated region. They differ from one another by the fact that the clipboard manager only requests one region for an entire operating session, whereas the drag manager can request plural memory regions, if appropriate to the drag-and-drop operations being performed.

Figure 4:
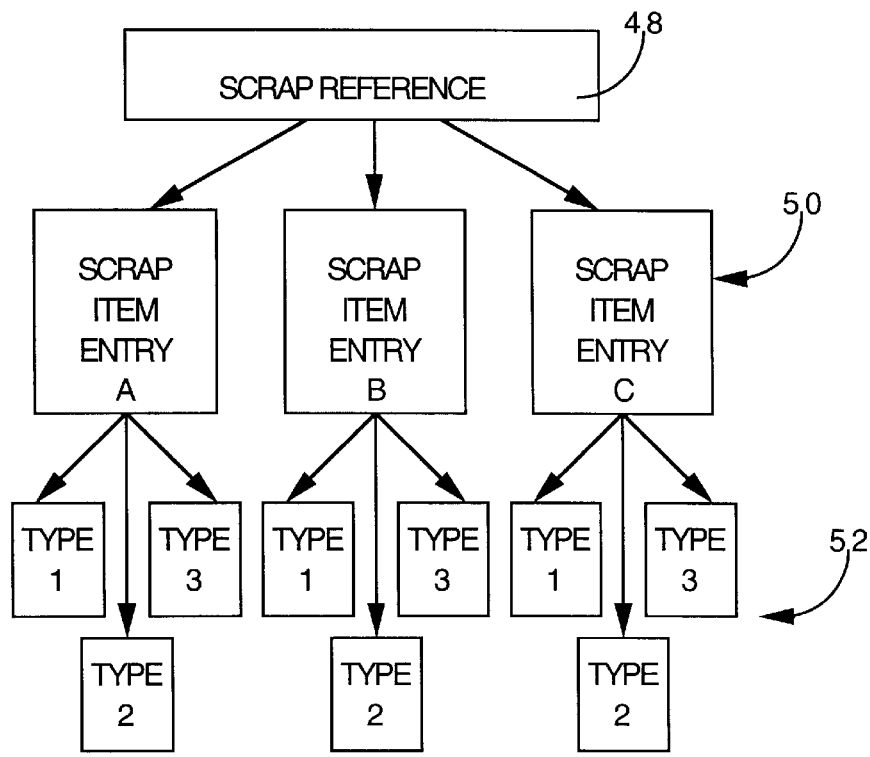
FIG. 4 is a block diagram illustrating the general architecture of the scrap manager in greater detail.

The architecture of the scrap manager 46 is illustrated in FIG. 4. Referring thereto, the scrap manager includes a data structure 48 labeled the scrap reference. The scrap reference 48 maintains a list of scrap item entries 50. There is a scrap item entry for each element of data that is added to the clipboard file. In the example of FIG. 4, there are three scrap item entries which might correspond to three objects in a graphics document or three icons on a desktop, for instance. Each entry maintains a list of scrap item types 52. There is one scrap item type entry for each type of data that can be added by an application, such as text, graphics, sound, etc. The scrap item entry 50 contains a pointer to the actual clipboard data posted by an application program. As shown in FIG. 4, the combination of these various data structures results in a tree formation, through which applications are provided access to the clipboard file.

Referring again to FIG. 3, in this type of architecture, access to the clipboard file 39 takes place in a preemptive environment. More particularly, when a user enters a command for a copy and paste operation, the application program 40 issues a call to the clipboard manager 42. The initial call is a request for a key, i.e. a scrap reference. If no other application currently has access to the file, the clipboard manager grants the access by passing the scrap reference to the requesting program. While the application 40 has the key, it can copy and paste information to and from the clipboard file 39. This is done by issuing calls to the scrap manager to place selected data in the clipboard file or retrieve data therefrom. As long as the application 40 has the key, no other application can obtain access to the clipboard file though the clipboard manager 42. Once the application is done with the clipboard, it returns the key, i.e., the scrap reference is passed back to the clipboard manager 42.

An advantage of this arrangement is the fact that access to the clipboard file is not limited to the one application which is running in the foreground. Rather, applications running in the background, as well as other background processes, can utilize the clipboard file by requesting the key.

It can be seen that, in order to make use of the features provided by the architecture of FIG. 3, an application program must be aware of the need to request the key from the clipboard manager 42 before gaining access to the clipboard file. Older application programs which were designed for cooperative scheduling do not have such awareness, and are therefore unable to access the clipboard manager 42 in the intended manner. Rather, those applications attempt to obtain access to the clipboard file through the conventional procedures associated with cooperative scheduling, namely by making calls to the scrap manager 46 or by directly accessing the file. If such an application is currently active, there is a possibility that it may attempt to access the clipboard file via cooperative procedures at the same time that a preemptively-oriented application, running in the background, attempts to access the file through a call to the clipboard manager 42.

Figure 5:
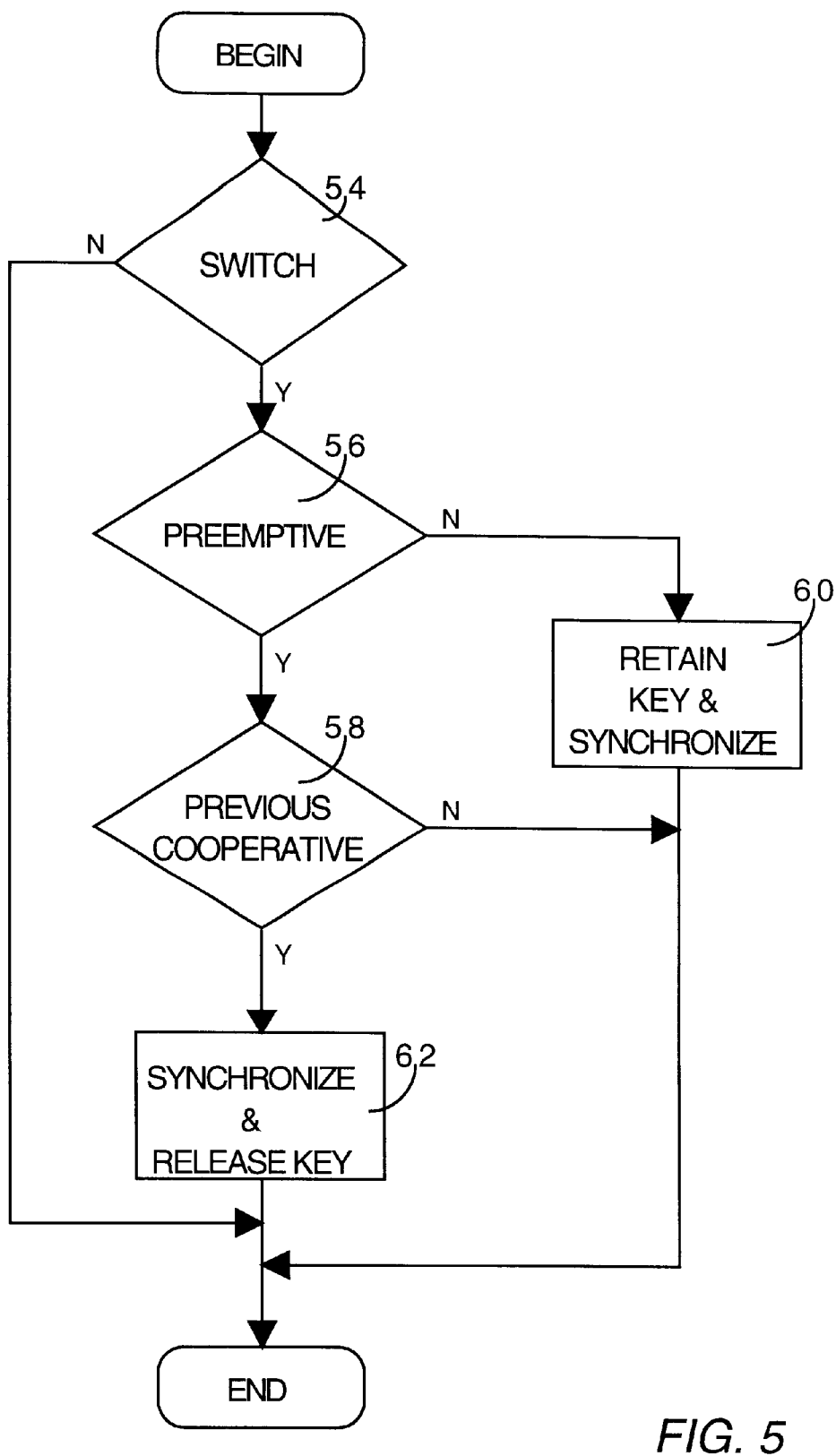
FIG. 5 is a flow chart of the procedure for ensuring compatibility between cooperatively scheduled and preemptively scheduled programs.

To prevent such a possibility, the clipboard manager 42 includes a routine that ensures backward compatibility with cooperatively scheduled application programs, and prevents such conflicts from occurring. For this purpose, two clipboard files are porvided. One clipboard file 39 is the master file that is associated with the interface of FIG. 3, and used with preemptively scheduled applications. The other clipboard file 38 is provided for purposes of backward compatibility with coopertaively scheduled programs. The routine for providing compatibility between the two types of applications is depicted in the flow chart of FIG. 5. Referring thereto, the routine is entered each time the foreground program running on the computer switches from one application to another. This switching of foreground applications is detected at step 54. When the switch is detected, a determination is made at step 56 whether the foreground program is a preemptively scheduled program, which is aware of the need to request a key from the clipboard manager, or cooperatively scheduled program which has no such awareness. If the foreground application is one which is aware of the need to request the key, the routine determines whether the previous application was a cooperatively scheduled one at step 58. If not, the routine ends.

If a cooperatively scheduled program which is not aware of the need to request the key becomes the foreground application, it will operate in a manner which assumes that it has ready access to the clipboard file 38 through cooperative scheduling. When this situation is detected at step 56, the clipboard manager 42 retains the key for itself at step 60. In addition, the current contents and state of the clipboard file 39 is synchronized with the cooperatively scheduled clipboard. More particularly, the information stored in the master clipboard file 39 is copied to the cooperatively scheduled clipboard file 38, where it can be accessed by the foreground program in the conventional manner. As long as the clipboard manager possesses the key, no other program running on the computer is able to gain access to the clipboard file, including preemptively scheduled applications which can request the key. Thus, as long as the cooperatively scheduled application remains the foreground application, it can have unrestricted access to the clipboard file. Once the cooperatively scheduled application is suspended, and a preemptively scheduled application becomes the foreground program, the clipboard manager 42 synchronizes the two clipboard files by copying the clipboard's contents back to the preemptively scheduled clipboard file 39, and releases the key, at step 62.

From the foregoing, it can be seen that the present invention provides a manager for clipboard copy and paste operations which ensures compatibility between preemptively scheduled application programs that are aware of the need to request a key for access to the clipboard file and cooperatively scheduled applications which have no such awareness. Whenever a cooperatively scheduled application becomes the active program, the key is retained by the clipboard manager itself, so that no other applications running in the background can interfere with the active application's access to the clipboard.

It will be appreciated by those of ordinary skill in the art that the present invention can be embodied in other forms without departing from the spirit or essential characteristics thereof. The presently disclosed embodiments are considered in all respects to be illustrative and not restrictive. The scope the invention is indicated by the appended claims, rather than the foregoing description, and all changes that come within the meaning and range of equivalents thereof are intended to be embraced therein.

What is claimed is:

1. A system for managing a common memory area that is accessible to a plurality of programs running a computer, comprising:

a data transport manager for allocating a region of memory to a program which requests access to said common memory area;

a second manager for issuing a key to a program in response to a request for service from said data transport manager, to thereby limit the number of programs which are serviced by said data transport manager at one time;

means for determining whether a program running as a foreground program on the computer is capable of requesting a key from said second manager; and means for inhibiting the issuance of a key to other programs running on the computer while a program which is not capable of requesting a key is a foreground program.

2. A method for managing a clipboard region of memory in a computer, capable of executing a first type of program and a second type of program which have respectively different operating modes for accessing said clipboard region, comprising the steps of:

generating requests for access to said clipboard region from programs of said first type;

issuing requesting programs of the first type a key which provides access to said clipboard region;

detecting that a program of said second type is a foreground program running on the computer; and preventing said key from being issued to any program of the first type while a program of the second type is a foreground program.

3. The method of claim 2 wherein programs of said first type access said clipboard region through preemptive scheduling, in which access to the clipboard region is limited to one application at a time through the issuance of the key.

4. The method of claim 2 wherein programs of said second type access said clipboard region through cooperative scheduling, in which access is obtained directly on through a clipboard management interface.

5. A system for managing a clipboard file that is accessible to a plurality of programs running on a computer, comprising:

a data transport manager for reading and writing data from and to a region of memory which corresponds to a clipboard file;

a clipboard manager that is responsive to commands from application programs to copy and paste data to and from said clipboard file, for issuing a key which grants the application programs access to said region of memory via said data transport manager; and a drag manager that is responsive to commands from application programs to drag data from one location to another, for issuing a key which grants access to said region of memory via said data transport manager.

6. The system of claim 5 wherein said data transport manager communicates directly with an application program that has been issued a key to read data from said region of memory and/or write data to said region of memory.

7. The system of claim 5 wherein said drag manager can issue plural keys, respectively corresponding to plural regions of clipboard file memory, at a time.

8. The system of claim 7 wherein said clipboard manager can only issue one key at a time.

9. The system of claim 5 wherein each key comprises a data reference containing a list of entries respectively corresponding to each element of data stored in the clipboard file.

10. The system of claim 9 wherein each entry on said list includes a pointer to the element of data, and an identification of a data type for the element of data.

11. The system of claim 5 wherein said clipboard manager includes means for determining whether a program running as a foreground program on the computer is capable of requesting a key, and means for inhibiting the issuance of a key to other programs while a program which is not capable of requesting a key is a foreground program.

12. The system of claim 1 wherein said data transport manager communicates directly with an application program that has been issued a key to read data from said region of memory and/or write data to said region of memory.

13. The system of claim 1 wherein each key comprises a data reference containing a list of entries respectively corresponding to each element of data stored in the clipboard file.

14. The system of claim 13 wherein each entry on said list includes a pointer to the element of data, and an identification of a data type for the element of data.

15. The system of claim 2 wherein each key comprises a data reference containing a list of entries respectively corresponding to each element of data stored in the clipboard region.

16. The system of claim 15 wherein each entry on said list includes a pointer to the element of data, and an identification of a data type for the element of data.

17. A computer-readable storage medium containing a clipboard management program which executes the following steps:

issuing keys to preemptive scheduling programs to provide access to a clipboard region of memory;

detecting whether a program running as a foreground program on a computer operates via cooperative scheduling; and preventing keys from being issued to preemptive scheduling programs while a cooperative scheduling program is running as a foreground program.

18. The system of claim 17 wherein each key comprises a data reference containing a list of entries respectively corresponding to each element of data stored in the clipboard region.

19. The system of claim 18 wherein each entry on said list includes a pointer to the element of data, and an identification of a data type for the element of data.

* * * * *